Oct. 20, 1936.    W. C. ANTHONY ET AL    2,057,655
VEHICLE
Filed Oct. 8, 1934    2 Sheets-Sheet 1

Inventors
William C. Anthony
Lester Wachter
by Parker & Carter.
Attorneys.

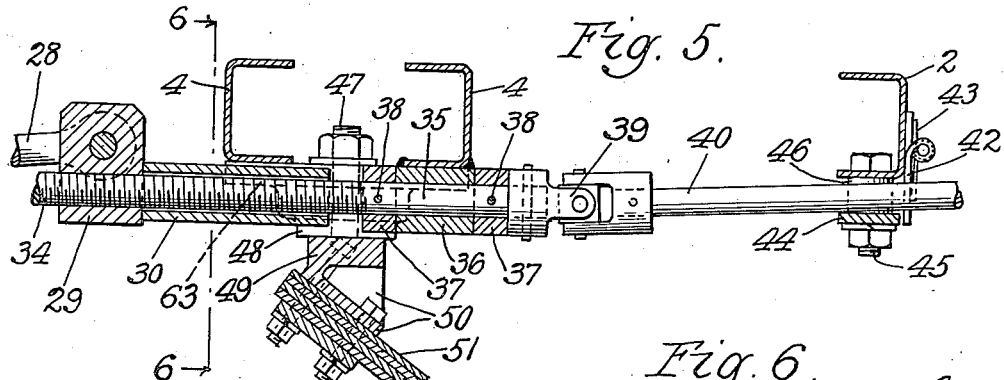
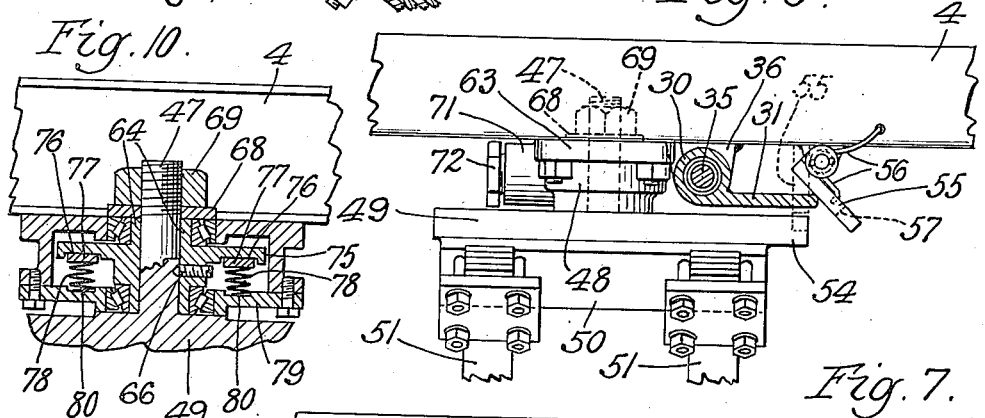
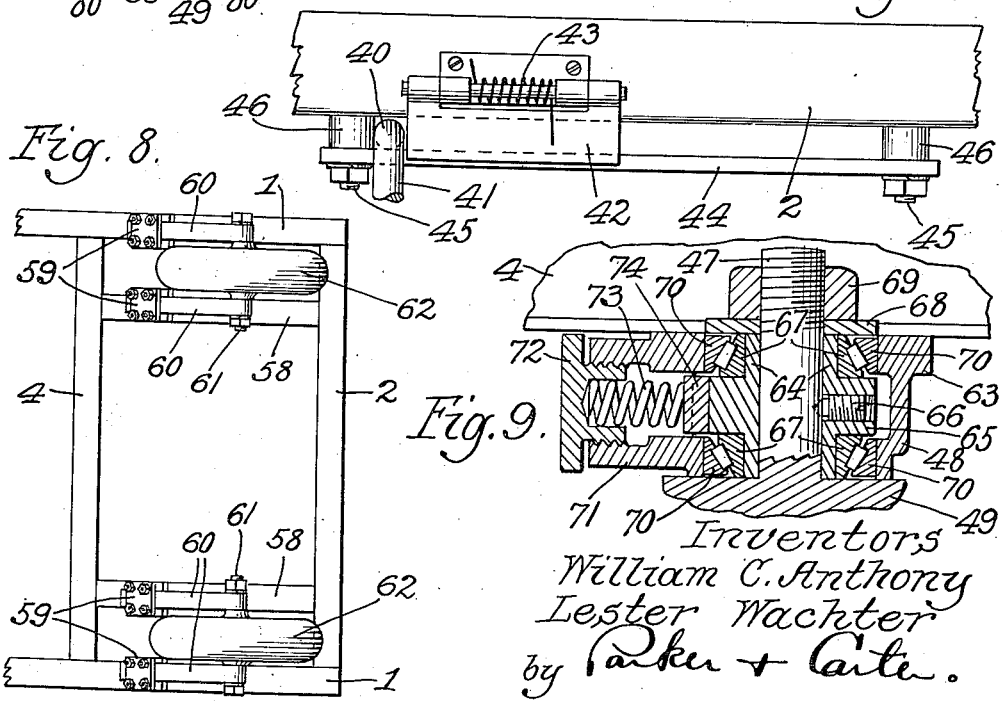

Patented Oct. 20, 1936

2,057,655

UNITED STATES PATENT OFFICE 2,057,655

VEHICLE

William C. Anthony and Lester Wachter, Streator, Ill., assignors to Anthony Development Company, Streator, Ill., a syndicate Application October 8, 1934, Serial No. 747,361

14 Claims. (Cl. 280—33.4)

This invention relates to a trailer, particularly to a trailer designed to be readily attached to an automotive vehicle. It has for one object to provide a trailer which may be readily attached to a tractor of any sort and which may also be used by itself as a truck or conveyor. To that end it is provided with three or four wheels which permit it to be self supporting and properly balanced when detached from the tractor. Another object of the invention is to provide in connection with a trailer, ready means for attaching and detaching the trailer from the tractor. A still further object is to provide a support for the trailer when it is not attached to the tractor and to provide means for moving such support.

Other objects will appear from time to time in the specification and claims.

The invention is illustrated more or less diagrammatically in the accompanying drawings, wherein:—

Figure 5 is a longitudinal vertical sectional detail taken on an enlarged scale at line 5—5 of Figure 2;

Figure 6 is a transverse vertical section, taken at line 6—6 of Figure 5;

Figure 7 is a fragmentary rear view;

Figure 8 is a fragmentary bottom plan view somewhat similar to Figure 2, and showing a modified form of the invention.

Figure 9 is a vertical sectional detail taken on an enlarged scale at line 9—9 of Figure 2, showing the friction means for controlling swinging movement of the wheel;

Figure 10 is a similar view showing a modified form.

Like parts are designated by like characters throughout the specification and drawings.

Figure 1:
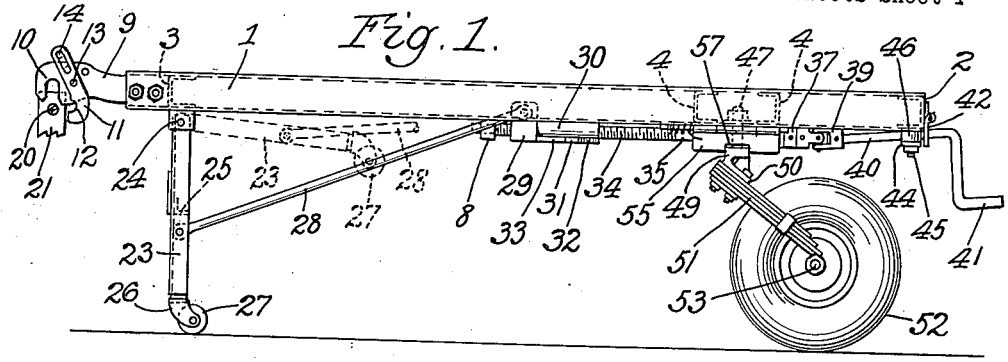
Figure 1 is a side elevation of the trailer.

A frame of almost any desired type and shape is provided for the trailer. In the form shown herewith the frame is made of a pair of side frame members 1, 1, which may be of any desired section, but as here shown are channels. A rear cross member 2 is also of channel section. A forward cross member 3 is provided. Intermediate the ends of the vehicle a pair of cross members 4, 4 may be provided. While they may be of any desired section or shape they are here shown as channels faced inwardly towards each other as shown particularly in Figure 5. Diagonal bracing members 6, 6 may be used to stiffen the frame and as shown they have secured to them a plate or web 7 which carries an eye 8.

Figure 3:
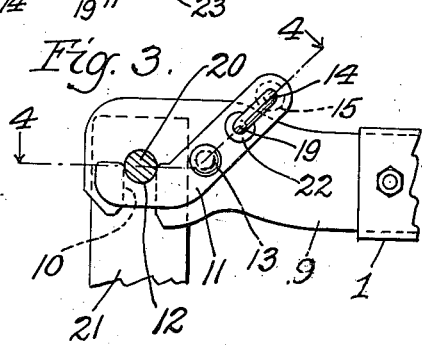
Figure 3 is a side elevational detail, taken on an enlarged scale, showing one of the attaching means.
Figure 4:
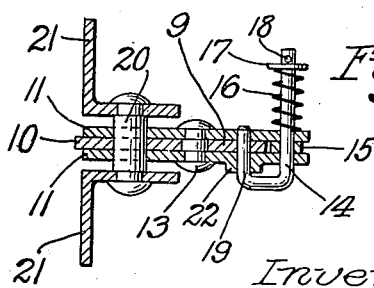
Figure 4 is a sectional detail taken at line 4—4 of Figure 3.

At the forward or attaching end of the trailer, preferably attached to the channels 1, are attaching members 9 each of which is provided with a hook 10 which is preferably deeper than the width of the member which it is to engage. A latch member is pivoted to the part 9. As shown it is formed of a pair of members 11, 11, one on each side of the member 9. Each of the members 11 is provided with a preferably rounded depression 12 to engage an attachment on the tractor. 13 is a pivot member passing through the members 11 and the member 9. It serves to hold the parts together and furnishes a pivot about which the latch may rotate. At its upper end each member 11 is laterally bent with respect to the portion within which the notch 12 is formed so that the upper ends of the members 11 forming the latch clear the member 9 as shown particularly in Figures 1 and 3. A locking latch 14 is mounted in the upper or clear end of the two latch members 11. A spacer 15 may be provided between them. About the laterally extended end of the member 14 is positioned a spring 16 which bears at one end against a washer or stop 17 held in place by a pin 18 and at the other end against one of the latch plates 11. This spring tends to hold the locking latch in the position shown particularly in Figure 4. The latch 14 is provided with a portion 19 which is parallel with and shorter than the main portion of the latch. It may be moved to penetrate through perforations in the two latch members 11 and in the member 9. When it lies within these perforations it locks the latch as a whole against movement. As shown particularly in Figure 3 and 4 the latch is so locked and it engages a member 20 carried on or between a pair of supports 21, 21, which are fastened to or mounted upon the tractor. It will be understood that the details of the member 20 are unimportant. The latch may engage any rod, shaft or projection of suitable size. The outside latch plate 11 may carry a raised boss 22, through which a perforation is formed.

To support the forward end of the trailer when it is out of contact with the tractor a pair of supporting legs 23 is provided. They are pivoted one upon each side of the trailer, preferably in a bearing support 24, one of which is affixed adjacent its forward end to each of the side frame members 1. They may be braced by an angle 25.

At its bottom each leg will preferably carry a caster 26, having a wheel 27 mounted for rotation in it.

Extending rearwardly from each of the legs is an inwardly inclined brace 28. Each of these braces is pivoted to a leg preferably intermediate its ends and is also pivoted to an interiorly threaded fitting 29 which forms part of or is attached to a tubular member 30. This member may carry upon it a cam 31 having cam faces 32 and 33. The use and operation of the cam will be described below. The tubular member 30 surrounds a thread 34 on a shaft 35, which has one end rotatably mounted in the eye 8 of the plate 7. The opposite end of the shaft 35 is mounted in a bearing 36 which may be fastened to one of the channels 4. Upon either side of the bearing 36, fixed to the shaft 35, is a spacing collar 37 which may be pinned to the shaft by pins 38. One end of the shaft 35 projects rearwardly beyond the bearing 36 and is connected by a universal joint 39 to a crank shaft 40 which extends rearwardly beyond the rear frame member 2 and terminates in a crank 41.

Figure 2:
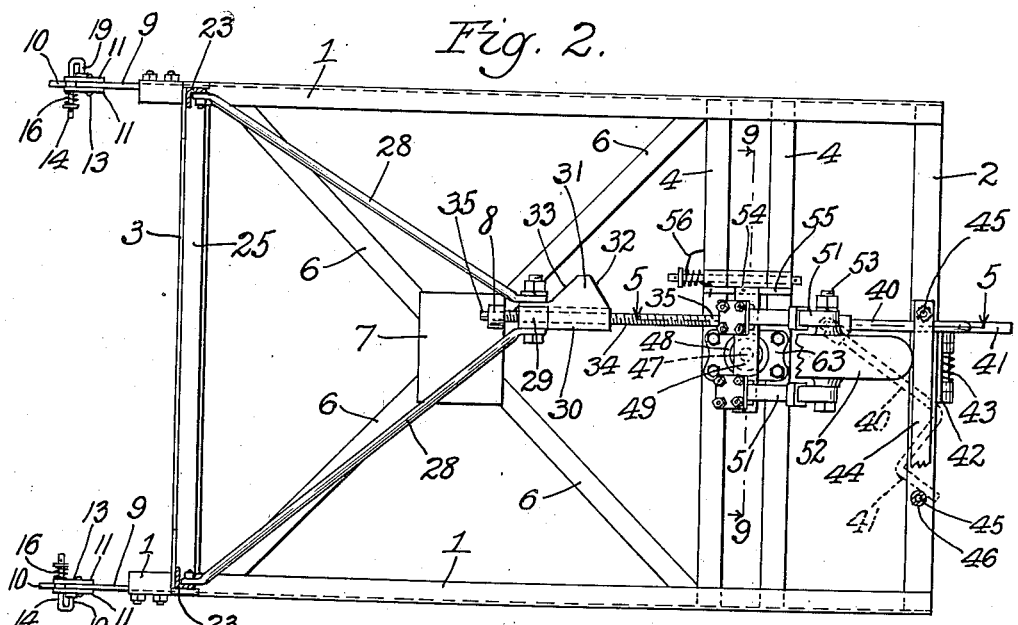
Figure 2 is a bottom plan view with parts broken away.

Mounted preferably upon the rear frame member 2 is a pivoted latch member 42. A spring 43 tends normally to hold it in the downward position as indicated particularly in Figures 5 and 7. When the crank shaft is not in use, it ordinarily occupies the dotted line position of Figure 2. It is thus moved out of alignment with the shaft 35 and partially lies beneath the lower flange of the rear frame member 2. It rests upon a supporting strip 44 which is held to the member 2 by bolts 45 and is properly spaced by spacers 46. When it is desired to use the crank the latch 42 is raised against the spring 43, the crank and crank shaft are swung inwardly to alignment with the shaft 35 until the crank shaft contacts the inner spacer 46 as shown in full lines in Figure 2 and in detail in Figure 7. The latch 42 is then allowed to return to the position of Figure 7 and the crank shaft may now be rotated. It cannot escape from its position of general alignment with the shaft 35 until further manipulation of the latch 42.

Rotation of the crank shaft 40 rotates the shaft 35 and so moves the member 29 and the sleeve along the screw 34 of the shaft 35. Rotation in one direction moves the legs 23 into the full line position of Figure 1. When the legs occupy this full line position they support the forward end of the trailer and in being moved into this position they preferably raise the hook member 9 out of contact with the member 20 on the tractor so that when the legs are in the full line position of Figure 1 the forward end of the trailer has been raised and freed from engagement with the tractor and the latter may be moved away or conversely the trailer can be moved away. Rotation of the crank shaft in the opposite direction moves the legs to the dotted line position of Figure 1 and so lowers the forward end of the trailer to permit engagement with the tractor.

Adjacent its rear the trailer is preferably supported upon a single or caster wheel. This wheel may be mounted in a number of different ways. The invention is not limited to the particular mounting shown. In the form shown a central vertical shaft 47 is mounted adjacent the rear of the trailer and preferably, of course, upon its longitudinal center line. A housing 48 surrounds the shaft and within the housing friction means are provided which, while they permit rotation, tend to resist it, and thus prevent rattling and shaking of the housing and of the wheel. In other words, the friction means makes rotation of the wheel in a generally horizontal plane about the axis of the member 47 difficult without making it impossible. Fastened to the shaft 47 is a member 49 which in the particular form of the device shown herewith has made integrally with it an angularly disposed member 50. This member serves as a support or receiving portion for a pair of cantilever leaf springs 51 which are spaced away a distance depending largely upon the size of the wheel to be used. A wheel 52 is positioned between the springs 51 upon a shaft 53 which is attached at each end to the free end of one of the springs 51. Thus the wheel and its mounting are in effect a caster. The wheel rotates about the shaft 53 in a generally vertical plane and the wheel and its support may rotate or swing in a generally horizontal plane about the generally vertical axis of the member 47.

For some purposes it is desirable to lock the wheel against swinging within the horizontal plane, that is to say, to prevent its caster action. For this purpose the member 49 is provided with an extension 54 which is shown particularly in Figure 6. It will be seen that the member 54 extends laterally to the right, farther than the opposite end of the member 49 and thus projects outwardly beyond the right hand spring 51. A locking latch member 55 is pivoted beneath and preferably upon the lower flanges of the channels 4. A spring 56 normally urges it into the downward position shown in dotted lines in Figure 6, and in full lines in Figure 1. From Figure 1 it will be seen that the latch 55 is cut away or notched as at 57 and when it is in the downward position the member 55 fits over the laterally extending end 54 of the member 49 and embraces it, preventing its movement and particularly preventing the caster action or lateral swinging of the wheel 52. When the legs 23 are in the downward position as shown in Figure 1, the cam 31 which is attached to the sleeve 30 is carried forward and there is nothing to prevent movement of the latch 55 into the position shown in that figure. It will thus engage and lock the wheel against caster movement. If the wheel should not be in position to be engaged by the latch when the latch first descends, the latch will remain held downwardly and as soon thereafter as sufficient movement of the wheel occurs to bring the portion 54 into register with the notch 57 the latching will occur. From Figure 6 it will be seen that the portion 54 extends farther laterally from the axis of the member 47 than does the opposite side of the member 49 and thus the latching can occur only when the portion 54 is to the right, and it will only occupy this position when the wheel 52 has been swung rearwardly as shown in Figure 1, and thus locking of the wheel against caster action can occur only when the wheel is in the rearward position. As the legs 23 are raised the sleeve 30 carrying the cam 31 moves rearwardly and finally strikes the latch 55 as shown in Figure 6, moves it from the dotted line or locking position of that figure to the full line or unlocking position of that figure and thus as the legs 23 are raised, which occurs normally only when the trailer is attached to a tractor, the caster wheel is freed for caster movement, which is normally desired only when the trailer is attached to a tractor and thus the raising of the legs 23 and the unlocking of the caster wheel occur together as a result of a single manipulation, namely, the rotation of the crank shaft 41. It will be noticed that the shaft 35 and the parts which engage and support it, are laterally out of alignment with the longitudinal central axis of the trailer.

As shown in Figure 8 the caster wheel feature is omitted and there are instead two rear wheels which do not have the caster arrangement. Otherwise the trailer is the same as that shown in the earlier figures. The crank shaft and its associated parts are omitted to avoid repetition and for clearness. Instead of the two channel members 4 as shown in the earlier figures a single channel member 4 is used and between it and the rear frame member 2 are mounted two frame members 58, which are preferably parallel with the side members 1. Spring supports 59 are mounted on each of the side members 1 and on each of the members 58 and each of these supports 59 carries a spring 60. There are thus two pairs of springs and between each pair a shaft 61 is mounted. Upon each of the shafts a wheel 62 is mounted for rotation. It will be understood that this form of the device, although it lacks the caster wheel feature, embodies all of the other features of construction shown in the earlier figures.

In the forms of the device which embody a caster wheel means are provided for resisting and controlling the swinging movement of the wheel in a generally horizontal plane so as to prevent its wabbling but still to permit it to move from side to side as the vehicle to which the trailer is attached is steered or turned. This device may take many forms and the two shown in Figures 9 and 10 in detail are merely illustrative of two possible arrangements. The housing which surrounds the friction mechanism is designated generally by the numeral 48. It is hollow and is preferably provided with a flange 63 which is bolted or otherwise fastened to the channels 4 as shown particularly in Figure 2. Mounted on the shaft 47 in the form shown in Figure 9 is a sleeve 64 which has projecting laterally from it a wheel or flange 65 fixed to the shaft by a pin 66 or otherwise. Mounted upon the sleeve above and below the flange 65 are the inner races 67 of antifriction bearings. A washer 68 is above the upper bearing and is forced against the bearing by a nut 69 upon the shaft 47. Thus the inner races of the two bearings are held upon the sleeve 64 and against rotation.

Fixed within the housing 48 are the outer races 70 of the antifriction bearings and between the inner and outer races of each bearing are mounted suitable rolling elements. In the forms here shown they are rollers. Balls or any other rolling elements might be substituted. The housing 48 may have a lateral extension 71 provided with a removable cover plate 72 within the inner face of which is set a compression spring 73 which bears against a brake shoe 74. The brake shoe contacts a portion of the flange 65 and thus exerts friction against it to resist and limit its movement. The degree of compression is variable by a change of springs and by moving the cover plate 72 in or out.

In the form of the device shown in Figure 10, the sleeve 64 and the washer 68 are as above described. The sleeve 64, however, carries a wider flange or disc 75, into the under face of which an annular groove 76 may be cut. One or more brake shoes 77 may be positioned within the groove 76 and they are held in frictional contact with it by compression springs 78 which rest upon a cover plate 79 and may be seated in appropriate depressions 80 formed on the inner face of the cover plate. The friction bearings provided in the form shown in Figure 10 are preferably the same as those provided in the form shown in Figure 9.

We claim:

1. In combination in a vehicle, a frame, a main wheel, a mounting therefor, including means arranged to permit the wheel to move bodily in a horizontal plane, and wheel locking means for locking it against such movement, and a plurality of auxiliary wheels, means for moving said wheels into and out of operative position, said moving means including unitary means for preventing locking of said main wheel when said auxiliary wheels are in inoperative position.

2. In combination in a vehicle, a frame, a main wheel, a mounting therefor, including means arranged to permit the wheel to move bodily in a horizontal plane, and wheel locking means for locking it against such movement, and a plurality of auxiliary wheels, means for moving said wheels into and out of operative position, and unitary means associated with said moving means for unlocking said main wheel.

3. In combination in a vehicle, a frame, a main wheel, a mounting therefor, including means arranged to permit the wheel to move bodily in a horizontal plane, and wheel locking means for locking it against such movement, and a plurality of auxiliary wheels, movable supports therefor, means for moving said wheels and said supports into and out of operative position, said moving means including unitary means for preventing locking of said main wheel when said auxiliary wheels are in inoperative position.

4. In combination in a vehicle, a frame, a main wheel, a mounting therefor, including means arranged to permit the wheel to move bodily in a horizontal plane, and wheel locking means for locking it against such movement, and a plurality of auxiliary wheels, movable supports therefor, means for moving said wheels and said supports into and out of operative position, and unitary means associated with said moving means for unlocking said main wheel.

5. In combination in a vehicle, a frame, a main wheel, a mounting therefor, including means arranged to permit the wheel to move bodily in a horizontal plane, and wheel locking means for locking it against such movement, and a plurality of auxiliary wheels, movable supports therefor, means for moving said wheels and said supports into and out of operative position, said moving means including a crowding mechanism whereby said supports are crowded under said vehicle to raise and support one end progressively as they are moved into operative position, said moving means including in addition unitary means for preventing locking of said main wheel when said auxiliary wheels are in inoperative position.

6. In combination in a vehicle, a frame, a main wheel, a mounting therefor, including means arranged to permit the wheel to move bodily in a horizontal plane, and wheel locking means for locking it against such movement, and a plurality of auxiliary wheels, movable supports therefor, means for moving said wheels and said supports into and out of operative position, and unitary means associated with said moving means for unlocking said main wheel, said moving means including a crowding mechanism whereby said supports are crowded under said vehicle to raise and support one end progressively as they are moved into operative position, said moving means including in addition unitary means for preventing locking of said main wheel when said auxiliary wheels are in inoperative position.

7. In combination in a trailer, a frame, a main caster wheel, means for supporting it from said frame, to permit its bodily rotation about a generally vertical axis, means for locking the wheel against such rotation, a pair of auxiliary wheels, pivoted arms supporting them, unitary means for moving said pivoted arms into and out of operative position and for simultaneously unlocking said caster wheel.

8. In combination in a trailer, a frame, a main caster wheel, means for supporting it from said frame, to permit its bodily rotation about a generally vertical axis, means for locking the wheel against such rotation, a pair of auxiliary wheels, pivoted arms supporting them, unitary means for moving said pivoted arms into and out of operative position and for simultaneously unlocking said caster wheel, said unitary means comprising a threaded shaft, means for rotating it, a member engaging said shaft and adapted to be moved by its rotation, operating braces connected to said member and one to each of said supports.

9. In combination in a trailer, a frame, a main caster wheel, means for supporting it from said frame, to permit its bodily rotation about a generally vertical axis, means for locking the wheel against such rotation, a pair of auxiliary wheels, pivoted arms supporting them, unitary means for moving said pivoted arms into and out of operative position and for simultaneously unlocking said caster wheel, said unitary means comprising a threaded shaft, means for rotating it, a member engaging said shaft and adapted to be moved by its rotation, operating braces connected to said member and one to each of said supports, and a cam adapted to contact and to move out of operative position said wheel locking member.

10. In combination in a trailer, a frame, a main caster wheel, means for supporting it from said frame, to permit its bodily rotation about a generally vertical axis, and a plurality of springs for said wheel mounted to move with said wheel in its rotation about said generally vertical axis, means for locking the wheel against such rotation, a pair of auxiliary wheels, pivoted arms supporting them, unitary means for moving said pivoted arms into and out of operative position and for simultaneously unlocking said caster wheel, said unitary means comprising a threaded shaft, means for rotating it, a member engaging said shaft and adapted to be moved by its rotation, operating braces connected to said member and one to each of said supports, and a cam adapted to contact and to move out of operative position said wheel locking member.

11. In combination in a trailer, a frame, a controlling shaft mounted thereon for rotation, a crank shaft movably attached to said controlling shaft and adapted to be moved into and out of operative position by being moved into and out of alignment with said controlling shaft, and a latch mounted on said trailer and adapted to hold the crank shaft in either position.

12. In combination in a trailer, a frame, a controlling shaft mounted thereon for rotation, a crank shaft movably attached to said controlling shaft and adapted to be moved into and out of operative position by being moved into and out of alignment with said controlling shaft, and a spring latch mounted on said trailer and adapted to hold the crank shaft in either position.

13. In combination in a trailer, a frame, a controlling shaft mounted thereon for rotation, a crank shaft movably attached to said controlling shaft by a universal joint and adapted to be moved into and out of operative position, and a spring latch mounted on said trailer and adapted to hold the crank shaft in either position.

14. In combination, a trailer and a tractor, a trailer-receiving attachment and an attachment-engaging member, mounted one upon the tractor and one upon the trailer, and adapted to be engaged and when so engaged to fasten the two together, a caster wheel on said trailer, an auxiliary support on said trailer adapted primarily for use when the trailer is detached from the tractor, means for locking the caster wheel and unitary means for controlling said lock and for moving said auxiliary support, said support, when in operative position, being of such length that it disengages the said attachment and engaging member to permit free separation of the trailer and tractor.

WILLIAM C. ANTHONY.
LESTER WACHTER.